United States Patent
Sakano et al.

[11] Patent Number: 5,631,812
[45] Date of Patent: May 20, 1997

[54] MOTOR DRIVE CONTROL METHOD

[75] Inventors: Tetsuro Sakano; Kohei Arimoto, both of Oshino-mura, Japan

[73] Assignee: Fanuc Ltd., Yamanashi, Japan

[21] Appl. No.: 244,594

[22] PCT Filed: Oct. 6, 1993

[86] PCT No.: PCT/JP93/01439

§ 371 Date: Jun. 2, 1994

§ 102(e) Date: Jun. 2, 1994

[87] PCT Pub. No.: WO94/08392

PCT Pub. Date: Apr. 14, 1994

[30]    Foreign Application Priority Data

Oct. 6, 1992  [JP]  Japan .................... 4-290872

[51] Int. Cl.⁶ ......................... H02M 5/45; H02P 3/18
[52] U.S. Cl. ............................... 363/37; 318/812
[58] Field of Search ................... 363/34, 35, 37, 363/40, 41, 98, 132; 318/800, 803, 805, 812, 816

[56]         References Cited

U.S. PATENT DOCUMENTS

| | | | |
|---|---|---|---|
| 4,876,637 | 10/1989 | Mose et al. | 363/37 |
| 4,903,184 | 2/1990 | Hirose | 363/37 |
| 4,933,828 | 6/1990 | Ogawa | 363/81 |
| 4,934,822 | 6/1990 | Higaki | 363/37 |
| 5,050,057 | 9/1991 | Notohara et al. | 363/37 |
| 5,483,167 | 1/1996 | Mikami | 324/510 |

FOREIGN PATENT DOCUMENTS

| | | |
|---|---|---|
| 60-234466 | 11/1985 | Japan . |
| 62-181676 | 8/1987 | Japan . |
| 1-190291 | 7/1989 | Japan . |

*Primary Examiner*—Matthew V. Nguyen
*Attorney, Agent, or Firm*—Staas & Halsey

[57]               ABSTRACT

A motor drive method designed to eliminate the effect of variation of main voltage in the current control based on the PWM control. A main voltage detecting circuit detects a main voltage Vlink, and a main voltage equivalent value Vlink1 is set to be equal to this detected main voltage Vlink. Each of deviations between phase current commands Icu, Icv and Icw and phase currents iu, iv and iw detected is multiplied by the proportional gain K. Each product is then divided by the main voltage equivalent value Vlink1 to obtain respective phase duty ratios ηu, ηv and ηw of the PWM signal. The PWM signals with these duty ratios are outputted to an electric power converter to turn on or off the control switching elements for the drive control of the motor. The main voltage equivalent value Vlink1 is set to the detected main voltage Vlink to become equal to the actual main voltage, so that it becomes possible to calculate the duty ratio of the PWM signal which corresponds to the actual main voltage. Thus, the current can be controlled according to the predetermined current response characteristics, whereby both the high-speed response and the steady control of the motor become available.

23 Claims, 8 Drawing Sheets

MOTOR DRIVE CONTROL METHOD

BACKGROUND OF THE INVENTION

1. Field of the Invention

The present invention relates to a motor drive control method which is controlled based on the PWM (Pulse Width Modulation) method, and more particularly to a motor drive current control method.

2. Description of the Related Art

FIG. 5 is a block diagram of a motor current drive circuit according to a conventional PWM control method. A block shown by a reference numeral 1 is a rectification circuit, which rectifies an AC electric power source of three phases, that is, R-, S- and T-, phases, to generate a DC main voltage Vlink. This main voltage Vlink is applied to a bridge circuit in an electric power conversion circuit 2. A reference character C1 represents a smoothing capacitor. A current control section 3 outputs PWM signals so that the motor current follows a current command Icmd on the basis of the current command Icmd and respective phase currents $i_1$ to $i_n$ detected by respective phase current detecting circuits 5-1 to 5-n, whereby the switching elements of the bridge circuit 2, such as transistors G1 to Gn, can be turned on and off.

FIG. 6 is a block diagram showing one example of a current drive circuit for a DC (direct current) motor based on the conventional PWM control system. A main voltage Vlink outputted from a rectification circuit 1 is applied to an electric power conversion circuit 2. This electric power conversion circuit 2 includes of a bridge circuit of transistors and diodes. A current control section 3 calculates a PWM signal based on a current command value Icmd and an actual current i detected by a current detector 5-1, and outputs the PWM signal to each of the base terminals of transistors G1 to G4 for the on-off control of each of the transistors and the drive control of a DC motor 6-3 therethrough. The on and off states of the transistors G1 to G4 are controlled in a manner such that the transistor G1 is on while the transistor G2 is off and vice versa, applying the same to the transistors G3 and G4, and that the transistors G1 and G4 are turned on and off simultaneously, applying the same to the transistors G2 and G3. As shown in FIG. 6, outputs of the current control section 3 are represented by reference characters G1 to G4 corresponding to the bases of respective transistors G1 to G4.

FIG. 7(a) is a block diagram illustrating current loop control based on the proportional control in the current control section 3 of the DC motor current drive circuit as shown in FIG. 6.

In the current control section 3, the current command value Icmd is subtracted from the actual current i detected by the current detector 5-1 to obtain a current deviation (Icmd−i), and this current deviation is multiplied by a predetermined current loop proportional gain K (set in an element 31) to obtain a voltage command Vcmd. Then, the resulting value is multiplied by a reciprocal of a doubled value of a predetermined main voltage equivalent value Vlink1 (in an element 32). To this result, ½ is added to obtain a duty ratio $\eta$ of the PWM signal. That is, $$\eta = Vcmd \cdot (\tfrac{1}{2} \cdot Vlink1) + \tfrac{1}{2}$$

The procedure for obtaining the PWM signal with this duty ratio $\eta$ (corresponding to a portion denoted by reference numeral 3 and encircled by a dotted line in FIG. 7(a)) is executed by ordinary processors. The PWM signal with this duty ratio $\eta$ is inputted into the gates (G1 to G4 of FIG. 6) of respective transistors in the electric power conversion circuit 2.

Then, ½ is subtracted from the output $\eta$ of the electric power control section 3, and the result is multiplied by a value of an element 10 to obtain a voltage V to be actually supplied to a motor. A half value of the element 10, i.e., Vlink2 of FIG. 7(a), is an actual main voltage Vlink outputted from the rectification circuit 1 of FIG. 6. When the actual main voltage Vlink remains constant regardless of time, and the value Vlink1 equivalent to the predetermined main voltage is equal to the value Vlink in the current control section 3 (i.e. element 32), or where Vlink=Vlink1=Vlink2, the voltage V to be applied to the motor is expressed as follows:

$$\begin{aligned} V &= \{1/2 + (Vcmd/2 \cdot Vlink1) - 1/2\} \cdot 2Vlink1 \\ &= Vcmd \end{aligned}$$

Thus, the command voltage Vcmd (=(Icmd−i)·K) is applied to the motor to drive it.

An element 11 represents a model of a DC motor, wherein R denotes a resistance of exciting coil and L, an inductance of the same.

The case where the AC motor such as the induction motor or synchronous motor is used differs from the case where the DC motor is used as is shown in FIG. 7(a) only in that the current command Icmd becomes the current command of each phase; the actual current i becomes the actual phase current of the corresponding phase; and the R and L of the element 11 become the resistance and inductance of the exciting coil of each phase respectively.

On the other hand, in the case of variable reluctance motors (VR motors), the method of obtaining the duty ratio $\eta$ and the conversion method for converting this duty ratio $\eta$ into the voltage V to be actually applied to the motor vary respectively depending on whether Vcmd≧0 as shown in FIG. 7(b) or Vcmd<0 as shown in FIG. 7(c). In this case, the coils of the stator of the VR motor are referred to as A-phase winding, B-phase winding and C-phase winding, - - - .

When the command voltage Vcmd of the A-phase winding is zero or positive (Vcmd≧0), the transistor G1 turns on, and the transistor G2 is switched (or the transistor G1 is switched, and the transistor G2 is turned on) as shown in FIG. 2. When both the transistors G1 and G2 are turned on, a voltage of Vlink2 is applied to the A-phase winding. When the transistor G1 is turned on, and the transistor G2 is turned off, the voltage applied to the A-phase coil becomes 0. Accordingly, if the duty ratio of switching of the transistor G2 is set to $\eta A$, an average voltage V applied to the A-phase winding is expressed as follows:

$$V = Vlink2 \times \eta A$$

Since it is required to satisfy the relationships of $\eta A=0$ when Vcmd=0, and $\eta A=1$ when Vcmd=−Vlink1, it is defined that $\eta A=Vcmd/Vlink1$.

On the other hand, when the command voltage Vcmd of the A-phase winding is negative (Vcmd<0), the transistor G1 is turned off, and the transistor G2 is switched (or the transistor G1 is switched, and the transistor G2 is turned off) in FIG. 2. When both the transistors G1 and G2 are turned off, a voltage of −Vlink2 is applied to the A-phase winding. When the transistor G1 is turned off, and the transistor G2 is turned on, the voltage applied to the A-phase winding becomes 0. Accordingly, an average voltage V applied to the A-phase winding is expressed as follows:

$$V = (1 - \eta_A)(-Vlink2)$$

Hence, to satisfy the relationship of $\eta_A=1$ when $Vcmd=0$, and $\eta_A=0$ when $Vcmd=-Vlink1$, it is defined that $\eta_A=(Vcmd/Vlink)+1$.

FIG. 8 shows the response of current when the current command Icmd is varied stepwise. The proportional gain K of the current loop control in the above-described current control section 2 is determined so as to satisfy the specification that the overshoot of current can be suppressed within a range of 0 to 10% as shown by a solid line in FIG. 8.

If the actual main voltage Vlink, an output of the rectification circuit 1, is constant without variation, and this constant voltage is set in the current control section 2 as the main voltage equivalent value Vlink1, the voltage V applied to the motor becomes the command voltage Vcmd, as described above, and enables the motor to satisfy the required specification with current characteristics shown by the solid line of FIG. 8. However, the actual main voltage Vlink varies due to variation of three phases, that is, R-, S- and T-, phases of AC voltage or regenerative voltage.

For example, when the proportional gain K is determined in a manner such that the actual current shows the stepwise response as is shown by the solid line in FIG. 8, if the actual main voltage Vlink=Vlink2 is lowered (i.e. becomes smaller than the predetermined main voltage equivalent value Vlink1), the voltage applied to the motor becomes lower than the command voltage Vcmd. As a result, as shown by a dotted line in FIG. 8, the step response, as well as the responses of speed and position, are delayed, adversely affecting the controllability.

On the contrary, when the actual main voltage Vlink=Vlink2 is increased (Vlink2>Vlink1), the voltage V applied to the motor becomes higher than the command voltage Vcmd. As a result, as shown by single-dot-and dash line, the current flowing through the motor exceeds the current command Icmd largely, thereby causing vibration of motor or a phenomenon that an excessive current alarm is actuated to forcibly stop the motor.

SUMMARY OF THE INVENTION

An object of the present invention is to provide a motor drive control method capable of controlling the motor stably without being affected by a variation of the main voltage.

In order to accomplish the above object, the present invention provides a motor drive control method based on PWM system, wherein a main voltage of a DC electric power source, which is applied to an electric power conversion circuit is detected, and a PWM signal is obtained by executing current loop processing by varying a main voltage equivalent value or a current loop gain to be used in the current loop processing according to the detected main voltage.

Another aspect of the present invention provides a motor drive control method, wherein a duty ratio of a pulse width modulation signal is obtained based on a deviation between a current command value and an actual current in a current control section of a motor current drive circuit for executing current loop. Further, the pulse width modulation signal is outputted to an electric power conversion circuit. On the other hand, in the electric power conversion circuit, a DC main voltage to be inputted to said electric power conversion circuit is applied to the motor at said duty ratio, an actual DC main voltage from a rectification circuit to be inputted to the electric power conversion circuit is detected, and said actual DC main voltage is inputted to said current control section. In addition, in the current control section, a duty ratio of the pulse width modulation signal is obtained by multiplying the deviation between the current command value and the actual current by a value which is inversely proportional to the actual DC main voltage, and the pulse width modulation signal is outputted to said electric power conversion circuit.

It will be preferable that said current control section executes the current loop control based on any one of proportional control, proportional-plus-integral (PI) control, proportional-plus-integral-plus-derivative (PID) control, integral-plus-proportional (IP) control, and integral-plus-proportional-plus-derivative (IPD) control.

Furthermore, it will be preferable that the current control section includes an element for multiplying said deviation between the current command value and the actual current by a gain, and an element for multiplying a reciprocal of a main voltage equivalent value, the gain or the main voltage equivalent value is varied according to the input of the detected main voltage, thereby obtaining a duty ratio of said pulse width modulation signal as a value which is proportional to the deviation between said current command value and the actual current and inversely proportional to the actual DC main voltage so that said pulse width modulation signal is outputted to said electric power conversion circuit.

As described above, according to the present invention, the main voltage is detected, and the main voltage equivalent value or the current loop proportional gain to be used in the current loop processing is varied based on thus detected main voltage. That is, by setting the main voltage equivalent value to be equal to the detected main voltage or by changing the proportional gain instead of the main voltage equivalent value, the voltage applied to the motor is equalized to the command voltage corresponding to the current command. As a result, the current of the motor flows in accordance with predetermined characteristics. Thus, it becomes possible to prevent the operational characteristics of the motor from being affected by variation of main voltage for stable controllability.

DETAILED DESCRIPTION OF THE PRESENT INVENTION

Figure 1:
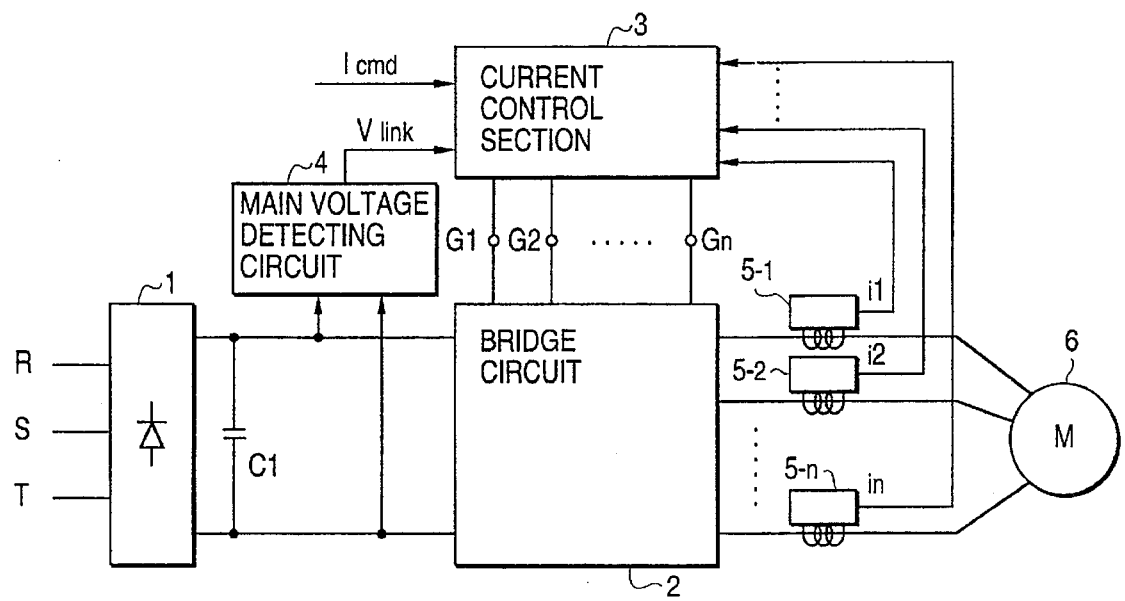
FIG. 1 is a block diagram showing a motor current drive circuit embodying the method of the present invention.
Figure 5:
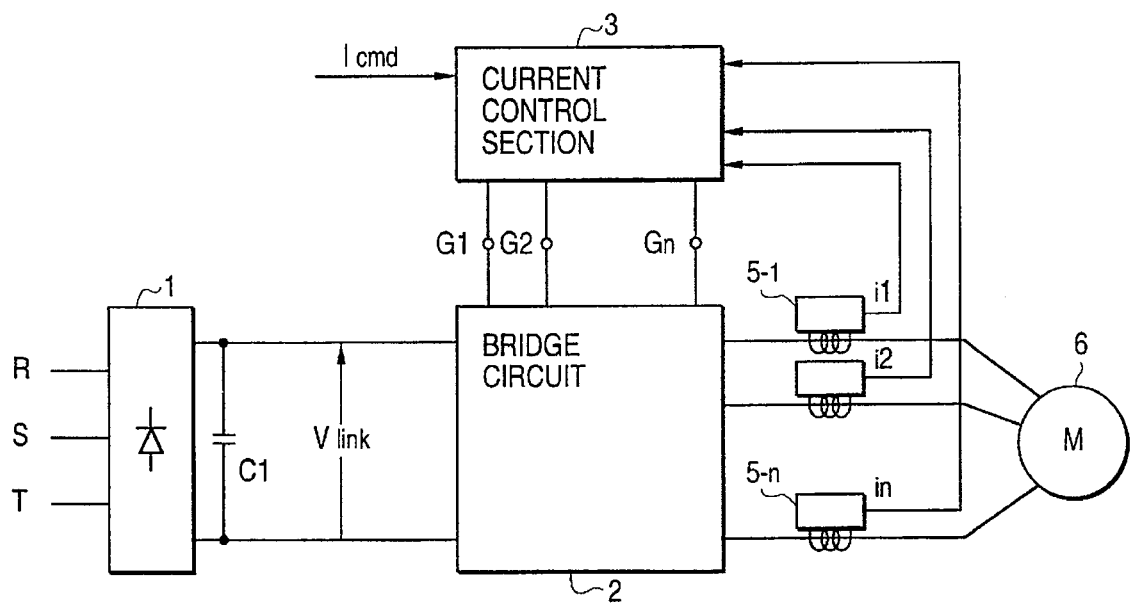
FIG. 5 is a block diagram showing current drive circuit of a conventional motor.
Figure 6:
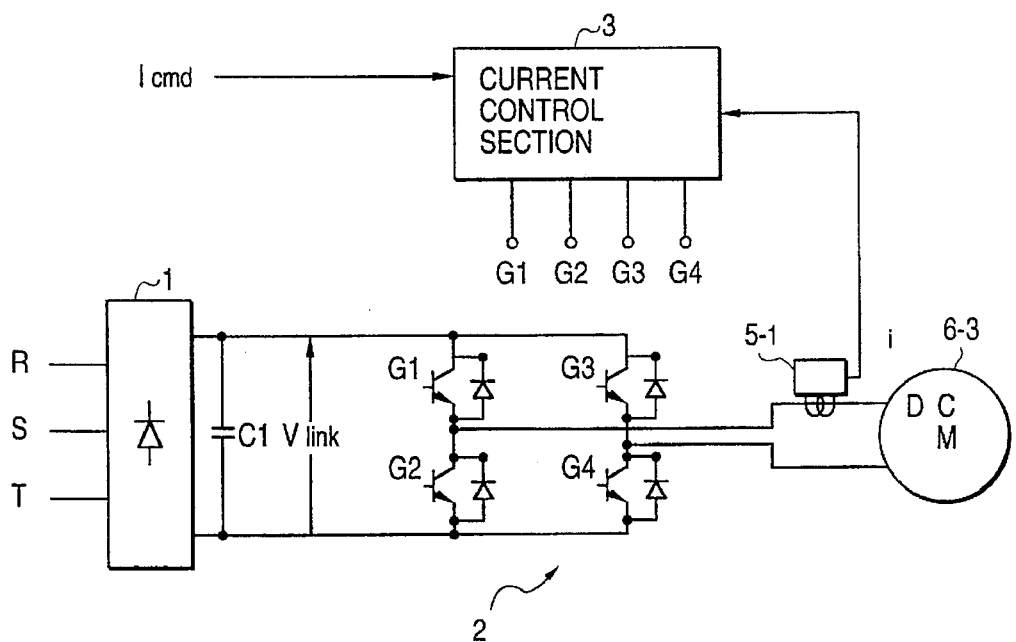
FIG. 6 is a block diagram showing a current drive circuit for a conventional DC motor.

FIG. 1 is a block diagram showing a motor current drive circuit embodying the method of the present invention, and is different from the conventional motor current drive circuit of FIG. 5 in that a main voltage detecting circuit 4 is additionally provided for detecting the main voltage Vlink.

A main voltage Vlink of DC voltage, which is outputted from the rectification circuit 1 after rectifying three-phase voltage, is applied to the bridge circuit 2 of an electric power converter. On the other hand, the main voltage detecting circuit 4 detects the main voltage Vlink and supplies a detected voltage to the current control section 3. The current control section 3 calculates PWM signals according to the later-described processing, on the bases of a current command Icmd, current values detected by current detecting circuits 5-1, 5-2, - - -, 5-n, and the main voltage Vlink detected by the main voltage detecting circuit. The PWM signals are used for on/off control of the switching elements in the bridge circuit 2 to drive the motor 6.

Figure 2:
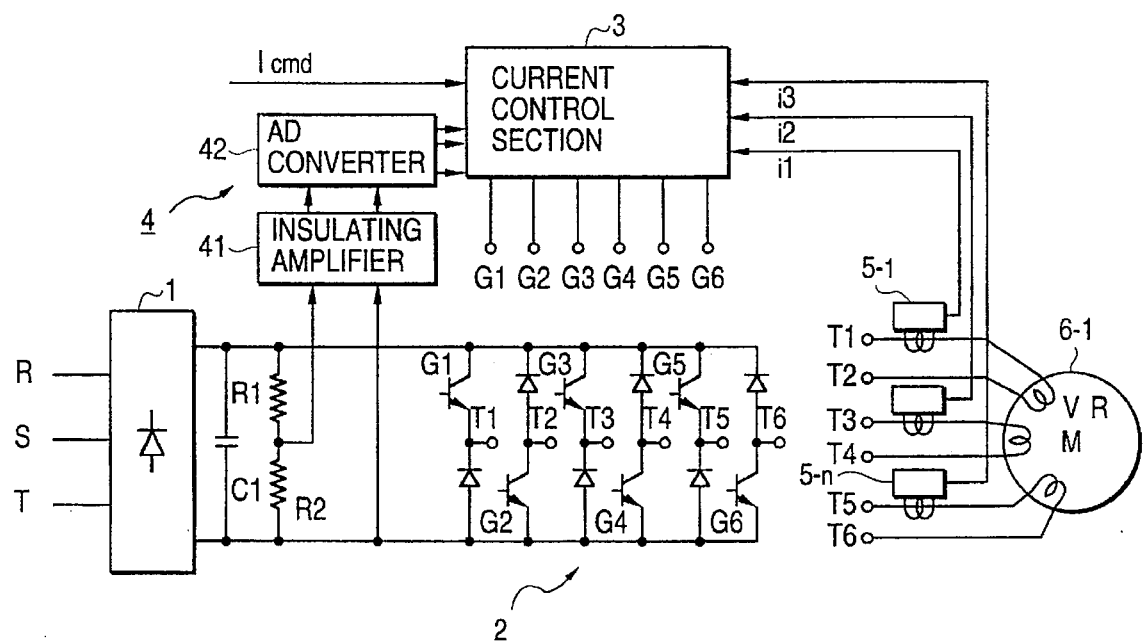
FIG. 2 is a block diagram showing a current drive circuit for a variable reluctance motor in accordance with one embodiment of the present invention.

FIG. 2 is a block diagram showing a current drive circuit wherein the motor 6 is replaced by a VR motor (variable reluctance motor) 6-1. This circuit is structurally and functionally identical with the circuit of the conventional VR motor in the configuration of the electric power converter 2 and in the control of the switching elements through the current control section 3, but is only different in the method of generating the PWM signal in the current control section 3. In the main voltage detection circuit 4, an insulating amplifier 41 receives the divided voltage of the output of a rectification circuit 1 (that is, the divided voltage of the voltage between both ends of a smoothing capacitor C1), and an AD converter 41 converts the output of the insulating amplifier 41 into a digital signal for inputting to the current control section 3. The current control section 3 comprises constituted of a processor, a ROM, a RAM, an input/output circuit and others in the same manner as the conventional one. Outputs of the current control section 3, as shown by the reference numerals of FIG. 2, are connected to the bases of transistors G1 to G6 of the bridge circuit 2, respectively. Outputs of the bridge circuit 2, as shown by reference numerals T1 to T6, are connected to winding terminals T1 to T6 of the motor, respectively.

Figure 3:
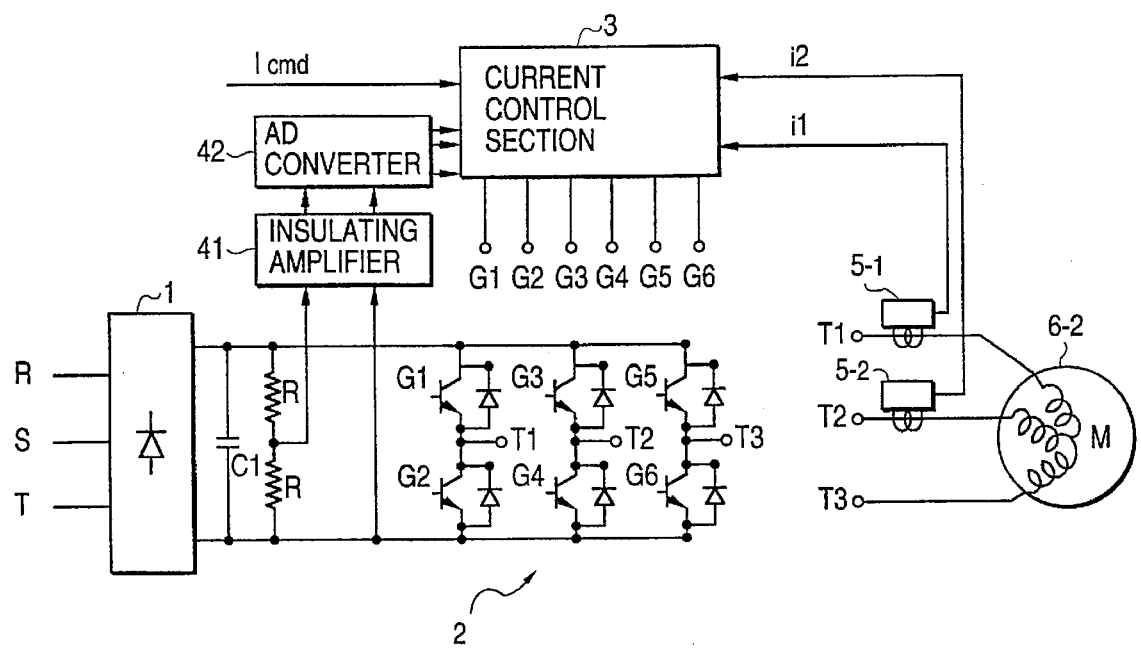
FIG. 3 is a block diagram showing a current drive circuit for a three-phase AC servo motor in accordance with one embodiment of the present invention.
Figure 4:
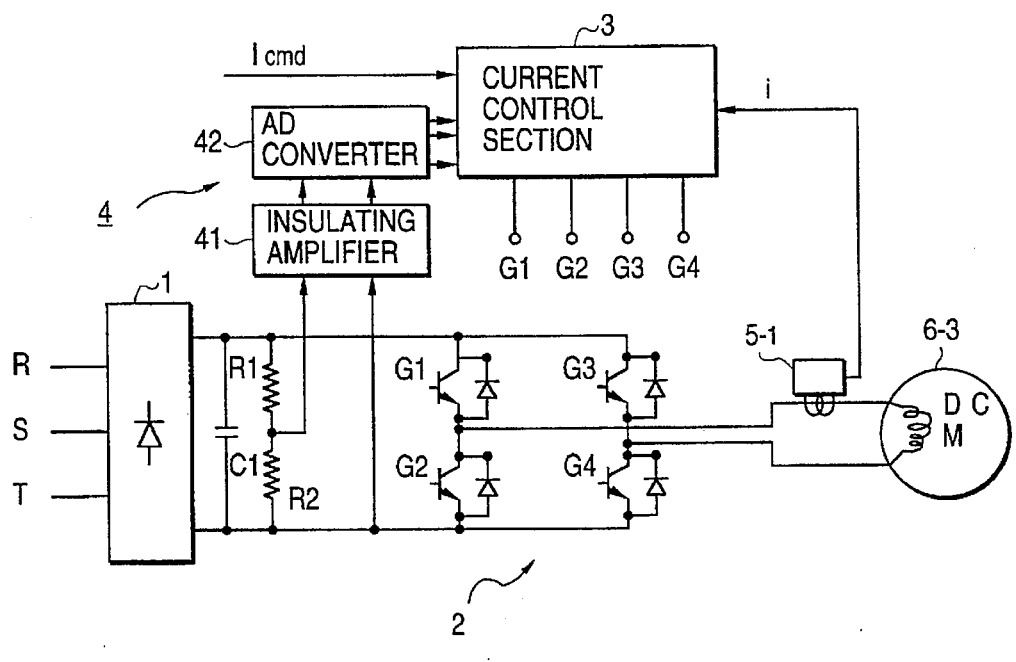
FIG. 4 is a block diagram showing a current drive circuit for a DC servo motor in accordance with one embodiment of the present invention.

FIG. 3 is a block diagram showing a current drive circuit for an AC motor 6-2, such as an induction motor and a synchronous motor, embodying the method of the present invention. FIG. 4 is a block diagram showing a current drive circuit for a DC motor 6-3, embodying the method of the present invention. These circuits differ from the conventional current drive circuits in that there are additionally provided voltage dividing resistances R1 and R2, an insulating amplifier 41, and an AD converter 42, and with respect to the method of processing in the current control section 3, while others remain the same. Outputs of the current control section 3, as shown by reference numerals of FIGS. 3 and 4, are connected to the bases of transistors of the bridge circuit 2, respectively, while outputs of the bridge circuit are connected to winding terminals.

Figure 9:
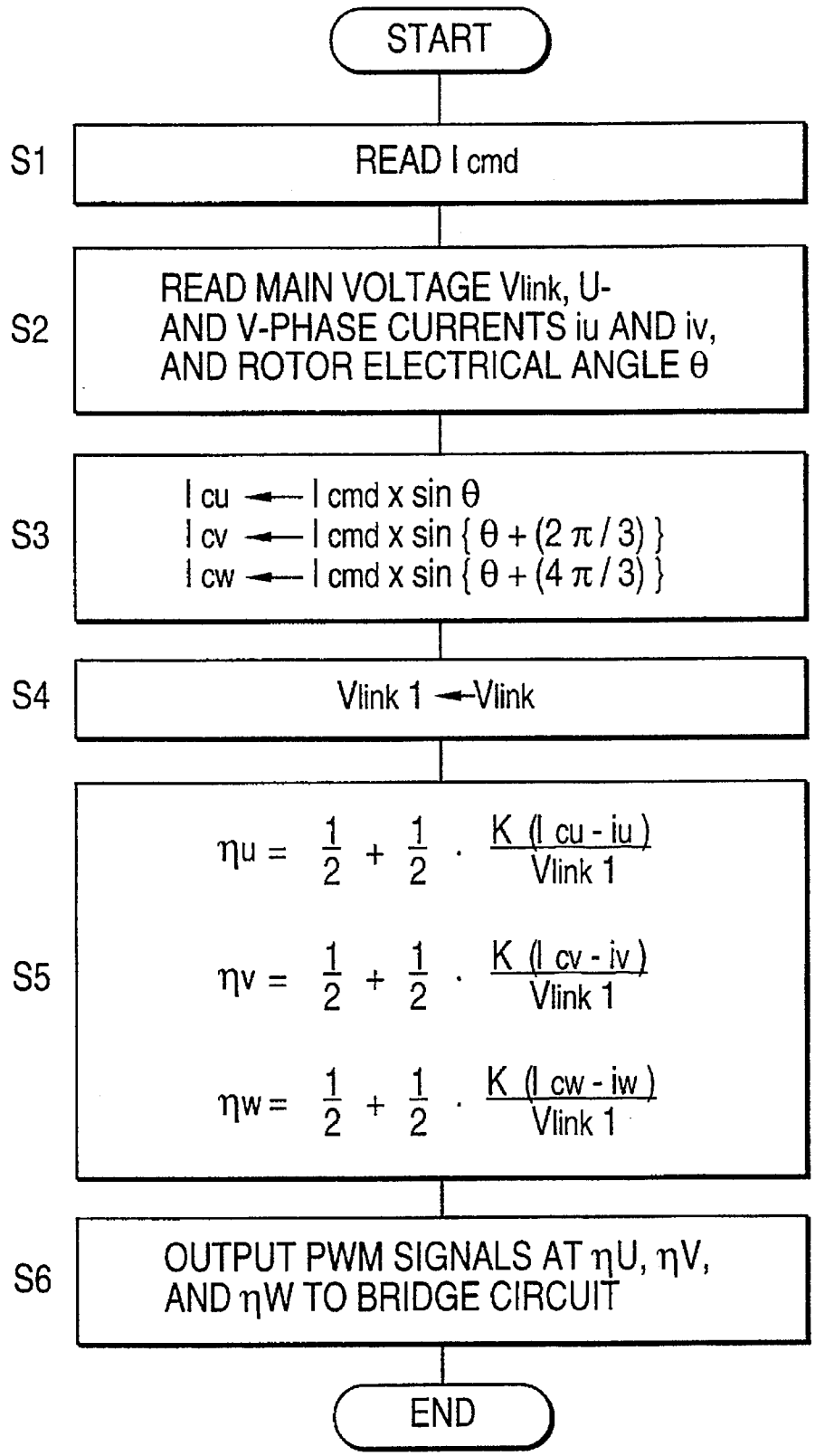
FIG. 9 is a flowchart showing current loop processing, executed at predetermined cycles by a processor of the current control section controlling the three-phase AC motor shown in FIG. 3.

FIG. 9 is a flowchart showing current loop processing to be executed by a processor of the current control section 3 for controlling the AC motor shown in FIG. 3. The processor executes the processing of FIG. 9 in each of predetermined cycles.

The processor reads the current command (torque command) Icmd, a value of main voltage Vlink outputted from the AD converter 42, and an electrical angle $\theta$ of a rotor detected by rotational position detector (not shown) for rotor. Furthermore, the processor reads actual phase currents iu (=i1) and iv (=i2) detected by the phase current detecting circuits 5-1 and 5-2 (Steps S1 and S2).

The U-, V- and W-phase command currents Icu, Icv and Icw are obtained by multiplying the current command Icmd read in the step S1 by sine waves whose phases are offset $2\pi/3$ one another based on the electrical angle $\theta$ read in the step S2. That is, the respective phase current commands are obtained by executing the following equations:

$Icu = Icmd \times \sin \theta$ $Icv = Icmd \times \sin \{\theta + (2\pi/3)\}$ $Icw = Icmd \times \sin \{\theta + (4\pi/3)\}$ Next, the main voltage equivalent value Vlink1 is set to be equal to the detected main voltage Vlink, which is outputted from the AD converter 42 and read in the step S2 (Step S4). Current deviations of phase currents of respective phase, Icu−iu, Icv−iv, Icw−iw, are obtained respectively by subtracting phase currents of U and V phase, iu, iv, which are read in the step S3 and a phase current of W phase, iw, which is obtained by adding the phase currents of U and V phase (=−iu−iv). Using thus obtained current deviations, the proportional gain K, and the main voltage equivalent value Vlink1 set in the step S4, the duty ratios $\eta u$, $\eta v$ and $\eta w$ of the U-, V- and W-phase PWM signals are obtained respectively by the following equations (Step S5):

$\eta u = \frac{1}{2} + (\frac{1}{2}) \cdot \{K \cdot (Icu - iu)/Vlink1\}$ $\eta v = \frac{1}{2} + (\frac{1}{2}) \cdot \{K \cdot (Icv - iv)/Vlink1\}$ $\eta w = \frac{1}{2} + (\frac{1}{2}) \cdot \{K \cdot (Icw - iw)/Vlink1\}$ Subsequently, the PWM signals with the above duty ratios $\eta u$, $\eta v$ and $\eta w$ are outputted to the gates of the U-, V- and W-phase transistors in the bridge circuit of the electric power converter 2 to turn on or off these transistors for drive control of the AC motor (Step S6).

The above processing is repeated in each predetermined cycle.

Although, in step S4 of the above embodiment, the main voltage equivalent value Vlink1 is set to be equal to the detected main voltage Vlink, it is also preferable to vary the proportional gain K without varying the main voltage equivalent value Vlink1. For example, when Ks is defined as a referential value of the proportional gain K, and Vlinks is defined as a referential value of the main voltage equivalent value with respect to a referential main voltage, the main voltage equivalent value is fixed to be equal to the referential value of the main voltage equivalent value (Vlink1=Vlinks), and a value of the proportional gain K is calculated by the following equation so that the current loop processing can be executed based on the obtained proportional gain.

$K = Ks \times Vlink1/Vlink$

FIG. 9 shows an example of the current control processing for a three-phase AC motor, however, a current control processing for a AC motor other than three-phase motor is substantially not changed, except that only the number of phase is either increased or decreased.

For the DC motor of FIG. 4, except that only one detecting current is used and only one duty ratio of the PWM signal is calculated, the processor of the current control section executes substantially the same processing as that of FIG. 9.

Figure 10:
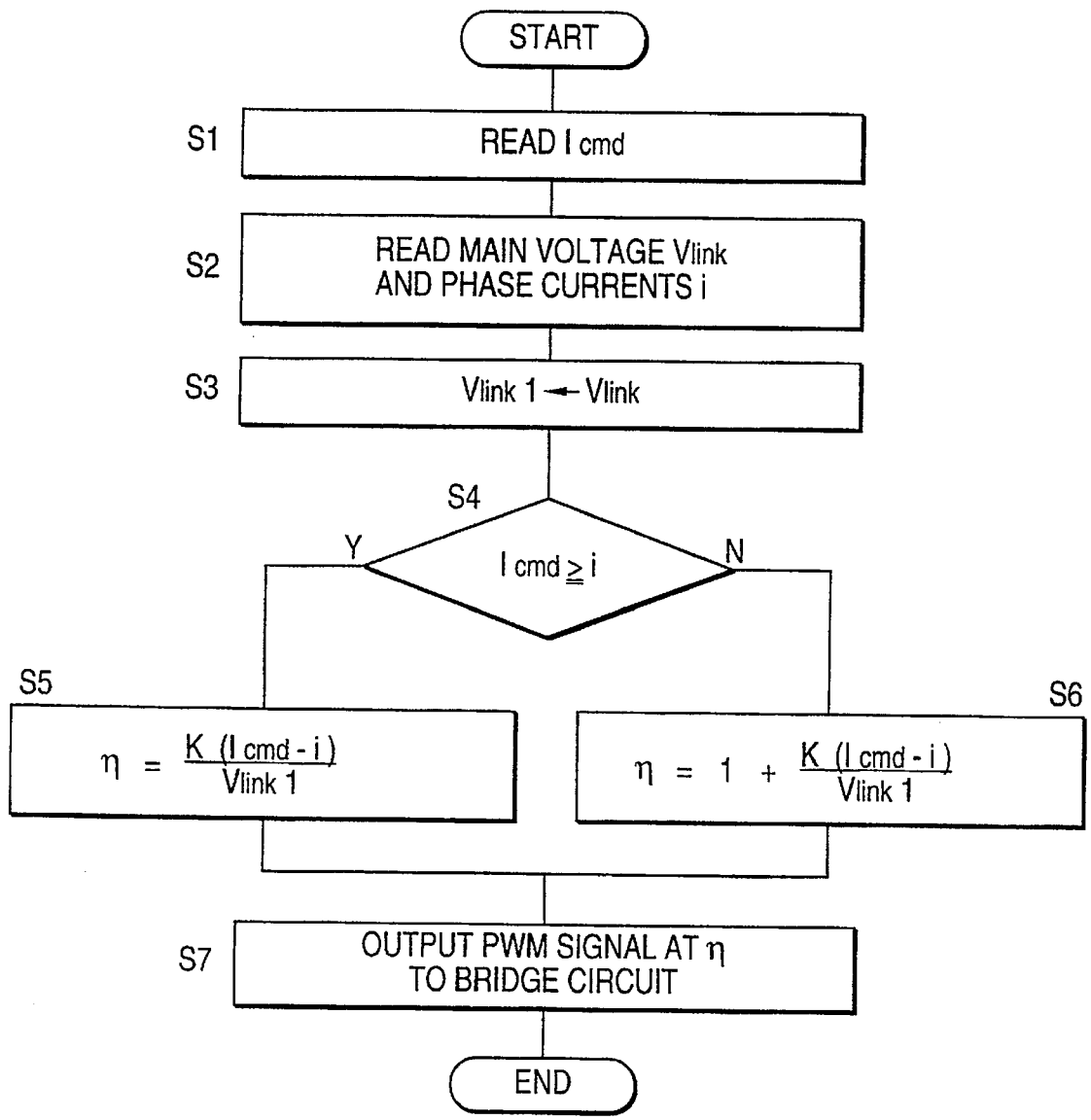
FIG. 10 is a flowchart showing current loop processing for one phase, executed in predetermined cycles by a processor of the current control section controlling the VR motor shown in FIG. 2.

Furthermore, FIG. 10 shows a flowchart showing current loop processing for one phase to be executed in each predetermined cycle by the processor of the current control section 3 for the VR motor shown in FIG. 2.

The processor reads, in each predetermined cycle, the current command (torque command) Icmd of each phase, a value of the main voltage Vlink outputted from the AD converter 42, and a phase current i of the corresponding phase which is detected from one of the phase current detecting circuits (5-1, 5-2,- - - , 5-n) (Steps S1 and S2). Then, the main voltage equivalent value Vlink1 is set to be equal to the detected main voltage Vlink which is outputted from the AD converter 42 and read in the step S2 (Step S3). Then, the current command Icmd read in the step S1 is compared with the phase current i of one phase read in the step S2 (step S4). When the current command Icmd is not smaller than the phase current i, the duty ratio η of PWM signal of the phase concerned is obtained according to the following equation (Step S5):

$$\eta = K \cdot (Icmd - i)/Vlink1$$

Then, thus obtained duty ratio η is supplied to the bridge circuit 2 (Step S7). On the contrary, when the current command Icmd is smaller than the phase current i, the duty ratio η of PWM signal of the phase concerned is obtained according to the following equation (Step S6):

$$\eta = 1 + K \cdot (Icmd - i)/Vlink1$$

Then, thus obtained duty ratio η is supplied to the bridge circuit 2 (Step S7).

As explained above, the present invention prevents the operational characteristics of the motor from being affected by variation of main voltage, realizes high-speed response, stabilizes the current loop, suppresses vibration of motor, and reduces generation of excessive current. Particularly, when the present invention is employed in the motor used as a servo motor, it becomes possible to bring excellent servo motor characteristics, such as improved response for speed/ position control and less variation.

Figure 7A:
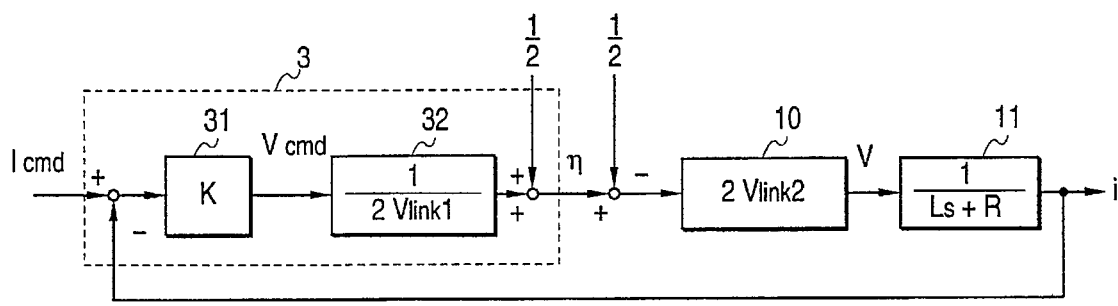
FIG. 7(a) is a block diagram showing current loop control applied to the current control section of the DC motor current drive circuit of FIG. 6.
Figure 7B:
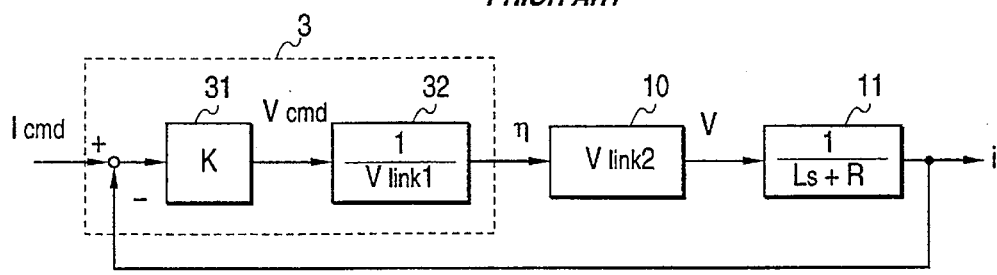
FIGS. 7(b) and 7(c) are block diagrams showing current loop control applied to the current control section of the current drive circuit for a variable reluctance motor.
Figure 7C:
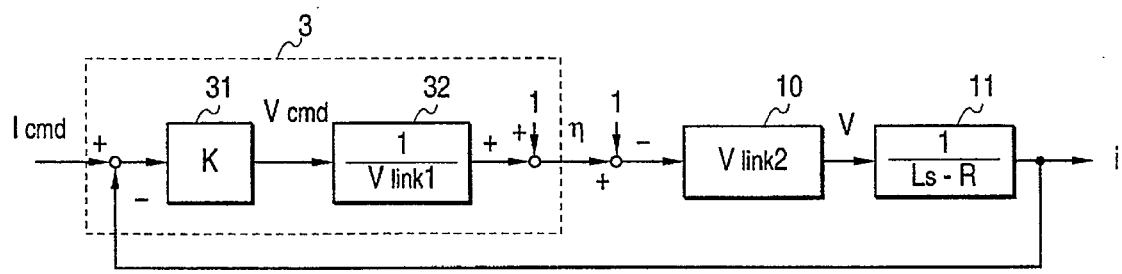
Figure 8:
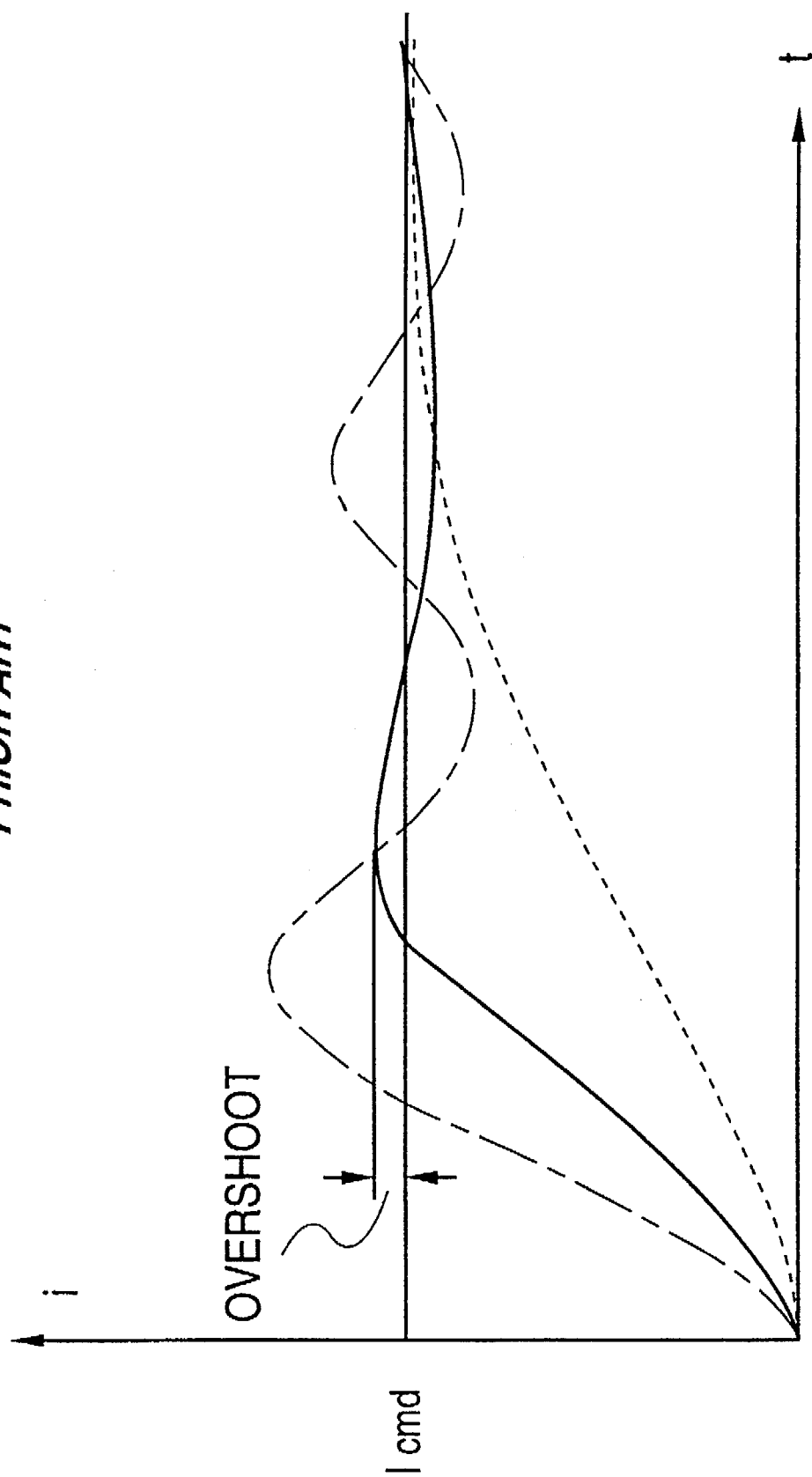
FIG. 8 is a graph showing step response of current in a conventional current control method applying the proportional control to the current loop.
Figure 11:
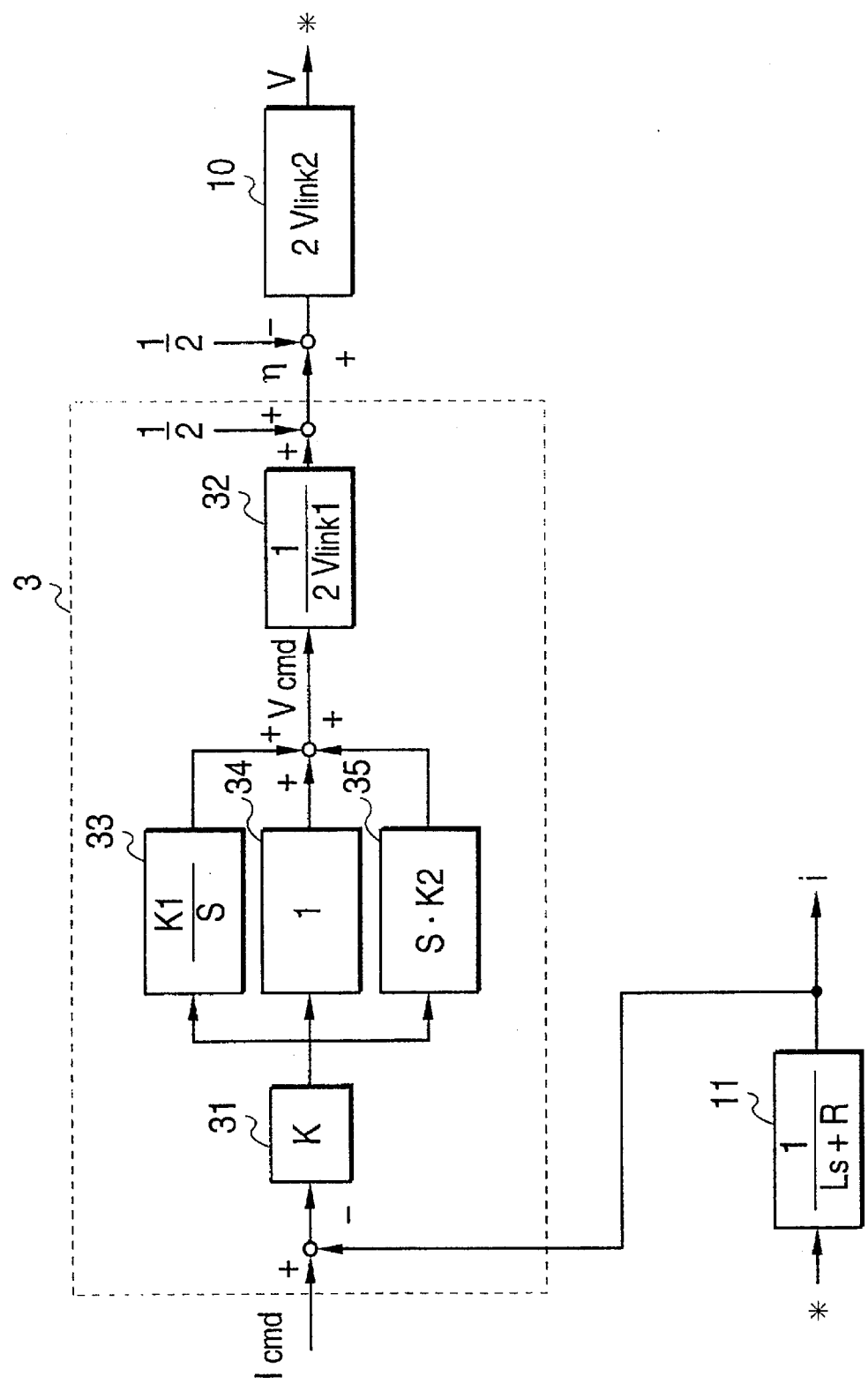
FIG. 11 is a block diagram showing an example of the current control section based on PID control.

Moreover, as explained of the proportional control in FIG. 7, the method of the present invention can be applied to any of PI control, PID control, IP control, and IPD control is applied. FIG. 11 is a block diagram showing an example of the current control section 3 in which the PID control is applied. In the block diagram of FIG. 11, reference character K of an element 31 represents a current loop gain. Also, reference character K1 of an element 33 represents an integral gain. Further, reference character K2 of an element 35 represents a differential gain. In the case of the control shown in FIG. 11, when the current loop gain K is determined so that K=Ks×Vlink1/Vlink or Vlink1=Vlink, it becomes possible to realize a current loop which is free of the effect of the variation of main voltage.

We claim:

1. A motor drive control method in which a motor is controlled based on Pulse Width Modulation (PWM) system, comprising the steps of:

obtaining a voltage command by multiplying a current deviation, which is equivalent to a difference between a current command and an actual motor current detected by a current detector, by a gain in a current loop;

obtaining a duty ratio of a PWM signal based on said voltage command and a main voltage equivalent;

outputting the PWM signal of the obtained duty ratio to gates of transistors in a bridge circuit of a power conversion circuit, and then controlling the motor by executing ON/OFF operations on said transistors;

one of detecting an actual main voltage which is applied, as the actual main voltage, to the bridge circuit of said power conversion circuit, and calculating the actual main voltage by detecting a value connected with the actual main voltage; and one of replacing said main voltage equivalent with said actual main voltage without varying said gain, and without varying said main voltage equivalent changing said gain to equal a result of dividing a value by said actual main voltage.

2. A motor drive control method, comprising the steps of:

obtaining a duty ratio of a pulse width modulation signal based on a deviation between a current command value and an actual current in a current control section of a motor current drive circuit executing current loop control;

outputting said pulse width modulation signal to an electric power conversion circuit;

applying in said electric power conversion circuit a DC main voltage to be input to said electric power conversion circuit to said motor at said duty ratio;

detecting an actual DC main voltage from a rectification circuit to be input to said electric power conversion circuit;

inputting said actual DC main voltage to said current control section;

obtaining in said current control section, a duty ratio of said pulse width modulation signal by multiplying said deviation between said current command value and said actual current by a value which is inversely proportional to said actual DC main voltage; and outputting said pulse width modulation signal to said electric power conversion circuit.

3. A motor drive control method in accordance with claim 2, wherein said current control section executes said current loop control based on proportional control.

4. A motor drive control method in accordance with claim 3, wherein said current control section comprises:

means for multiplying said deviation between said current command value and said actual current by a gain, and means for multiplying said deviation between said current command value and said actual current by a reciprocal of a main voltage equivalent value, and said gain is varied according to the input of the detected main voltage, thereby obtaining a duty ratio of said pulse width modulation signal as a value which is proportional to said deviation between said current command value and said actual current and inversely proportional to said actual DC main voltage so that said pulse width modulation signal is outputted to said electric power conversion circuit.

5. A motor drive control method in accordance with claim 3, wherein said current control section comprises:

means for multiplying said deviation between said current command value and said actual current by a gain, and means for multiplying said deviation between said current command value and said actual current by a reciprocal of a main voltage equivalent value, and said main voltage equivalent value is varied according to the input of the detected main voltage, thereby obtaining a duty ratio of said pulse width modulation signal as a value which is proportional to said deviation between said current command value and said actual current and reversely proportional to said actual DC main voltage so that said pulse width modulation signal is outputted to said electric power conversion circuit.

6. A motor drive control method in accordance with claim 2, wherein said current control section executes said current loop control based on proportional-plus-integral control.

7. A motor drive control method in accordance with claim 6, wherein said current control section comprises:
means for multiplying said deviation between said current command value and said actual current by a gain, and
means for multiplying said deviation between said current command value and said actual current by a reciprocal of a main voltage equivalent value, and said gain is varied according to the input of the detected main voltage, thereby obtaining a duty ratio of said pulse width modulation signal as a value which is proportional to said deviation between said current command value and said actual current and reversely proportional to said actual DC main voltage so that said pulse width modulation signal is outputted to said electric power conversion circuit.

8. A motor drive control method in accordance with claim 6, wherein said current control section comprises:
means for multiplying said deviation between said current command value and said actual current by a gain, and
means for multiplying said deviation between said current command value and said actual current by a reciprocal of a main voltage equivalent value, and said main voltage equivalent value is varied according to the input of the detected main voltage, thereby obtaining a duty ratio of said pulse width modulation signal as a value which is proportional to said deviation between said current command value and said actual current and inversely proportional to said actual DC main voltage so that said pulse width modulation signal is outputted to said electric power conversion circuit.

9. A motor drive control method in accordance with claim 2, wherein said current control section executes said current loop control based on proportional-plus-integral-plus-derivative control.

10. A motor drive control method in accordance with claim 9, wherein said current control section comprises:
means for multiplying said deviation between said current command value and said actual current by a gain, and
means for multiplying said deviation between said current command value and said actual current by a reciprocal of a main voltage equivalent value, and said gain is varied according to the input of the detected main voltage, thereby obtaining a duty ratio of said pulse width modulation signal as a value which is proportional to said deviation between said current command value and said actual current and inversely proportional to said actual DC main voltage so that said pulse width modulation signal is outputted to said electric power conversion circuit.

11. A motor drive control method in accordance with claim 9, wherein said current control section comprises:
means for multiplying said deviation between said current command value and said actual current by a gain, and
means for multiplying said deviation between said current command value and said actual current by a reciprocal of a main voltage equivalent value, and said main voltage equivalent value is varied according to the input of the detected main voltage, thereby obtaining a duty ratio of said pulse width modulation signal as a value which is proportional to said deviation between said current command value and said actual current and inversely proportional to said actual DC main voltage so that said pulse width modulation signal is outputted to said electric power conversion circuit.

12. A motor drive control method in accordance with claim 2, wherein said current control section executes said current loop control based on integral-plus-proportional control.

13. A motor drive control method in accordance with claim 12, wherein said current control section comprises:
means for multiplying said deviation between said current command value and said actual current by a gain, and
means for multiplying said deviation between said current command value and said actual current by a reciprocal of a main voltage equivalent value, and said gain is varied according to the input of the detected main voltage, thereby obtaining a duty ratio of said pulse width modulation signal as a value which is proportional to said deviation between said current command value and said actual current and inversely proportional to said actual DC main voltage so that said pulse width modulation signal is outputted to said electric power conversion circuit.

14. A motor drive control method in accordance with claim 12, wherein said current control section comprises:
means for multiplying said deviation between said current command value and said actual current by a gain, and
means for multiplying a reciprocal of a main voltage equivalent value, and said main voltage equivalent value is varied according to the input of the detected main voltage, thereby obtaining a duty ratio of said pulse width modulation signal which is proportional to said deviation between said current command value and said actual current and inversely proportional to said actual DC main voltage so that said pulse width modulation signal is outputted to said electric power conversion circuit.

15. A motor drive control method in accordance with claim 2, wherein said current control section executes said current loop control based on integral-plus-proportional-plus-derivative control.

16. A motor drive control method in accordance with claim 15, wherein said current control section comprises:
means for multiplying said deviation between said current command value and said actual current by a gain, and
means for multiplying a reciprocal of a main voltage equivalent value, and said gain is varied according to the input of the detected main voltage, thereby obtaining a duty ratio of said pulse width modulation signal as a value which is proportional to said deviation between said current command value and said actual current and inversely proportional to said actual DC main voltage so that said pulse width modulation signal is outputted to said electric power conversion circuit.

17. A motor drive control method in accordance with claim 15, wherein said current control section comprises:
means for multiplying said deviation between said current command value and said actual current by a gain, and
means for multiplying said deviation between said current command value and said actual current by a reciprocal of a main voltage equivalent value, and said main voltage equivalent value is varied according to the input of the detected main voltage, thereby obtaining a duty ratio of said pulse width modulation signal as a value which is proportional to said deviation between said current command value and said actual current and inversely proportional to said actual DC main voltage so that said pulse width modulation signal is outputted to said electric power conversion circuit.

18. A motor drive control method in accordance with claim 17, wherein said motor is a variable reluctance motor.

19. A motor drive control method in accordance with claim 17, wherein said motor is an alternating current motor.

20. A motor drive control method in accordance with claim 17, wherein said motor is a direct current motor.

21. A motor drive control method in accordance with claim 1, wherein said motor is a variable reluctance motor.

22. A motor drive control method in accordance with claim 1, wherein said motor is an alternating current motor.

23. A motor drive control method in accordance with claim 1, wherein said motor is a direct current motor.

* * * * *